Aug. 25, 1942.  C. HOMAN  2,294,302
TULIP BEDDER
Filed Dec. 5, 1939  2 Sheets-Sheet 1
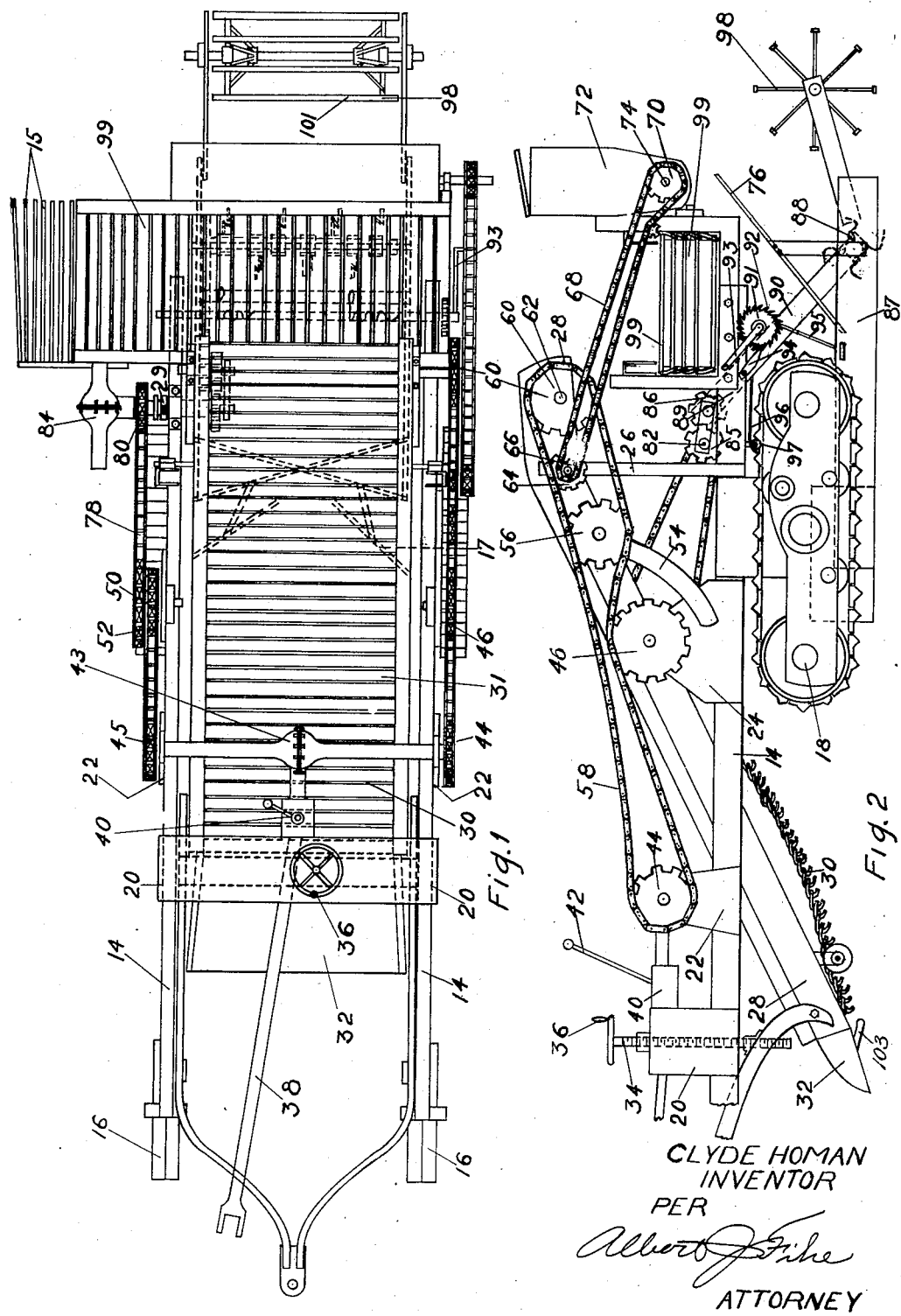
CLYDE HOMAN
INVENTOR
PER
ATTORNEY

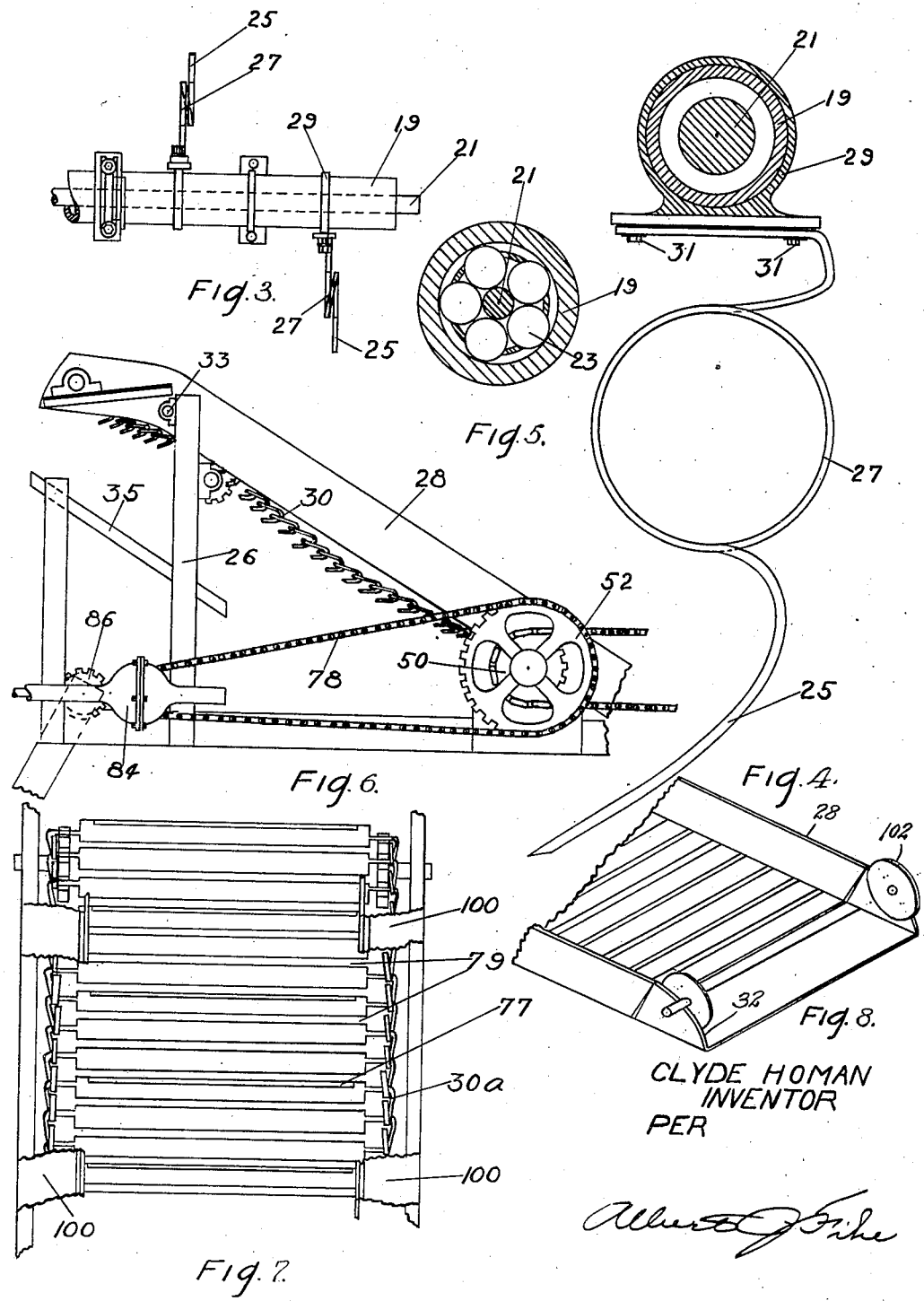

Patented Aug. 25, 1942

2,294,302

UNITED STATES PATENT OFFICE 2,294,302

TULIP BEDDER

Clyde Homan, Chicago, Ill.

Application December 5, 1939, Serial No. 307,657

14 Claims. (Cl. 97—10)

This invention relates to a new and improved tulip bedder and has for one of its principal objects the provision of a device which excavates tulip beds, simultaneously acts as a bedder or coverer for the previously excavated adjacent bed and is also readily adaptable as a harvester for tulip bulbs.

An important object of this invention is to provide a device which will dig a tulip bed of maximum feasible width and with the same apparatus fill in a parallel bed and the entire construction requiring only a minimum shoulder between the adjacent tulip bed rows.

Another important object of this invention is the provision of a machine which properly prepares a tulip bed for the ready planting of tulip bulbs, as it excavates a bed of predetermined width and depth, removes the dirt, applies a fertilizer to the bottom of the bed, mixes the fertilizer into the base of the bed and finally marks the bed into evenly spaced transverse rows.

Other and further important objects of the invention will be apparent from the disclosures in the accompanying drawings and following specification.

The invention, in a preferred form, is shown in the drawings and hereinafter more fully described.

In the drawings:

Figure 1 is a top plan view of the improved tulip bedder of this invention.

Figure 2 is a side elevation of one form of tulip bedder of this invention with the towing member and front portion cut away.

Figure 3 is a front detail of the rotor tiller used with the device shown in Figures 1 and 2.

Figure 4 is a greatly enlarged detail of one of the teeth as used on the rotor as shown in Figure 3.

Figure 5 is a detail of the ball bearing used to support the rotor tiller shown in Figure 3.

Figure 6 is a partial side elevation of the device as shown in Figure 1 including the driving means for the transverse drape and rotor tiller.

Figure 7 is a detail of a drape which can be used with the bedder as shown in the device of Figures 1 and 2.

Figure 8 shows an attachment whereby a straight sided trench can be more readily cut.

As shown in the drawings:

The reference numeral 14 indicates generally the framework or chassis upon which the combination tulip bedder and harvester of this invention is supported. The chassis 14 is supported by wheels 16 in the front and caterpillar tractor wheels in the rear. Upon this chassis 14 is mounted a series of pairs of vertical plates 20—22—24 and also 26. Upon the uprights 26 a framework 28 is pivoted which houses the main longitudinal drape or conveyor 30. At the lower front portion of this framework and housing 28 is positioned a digger or shovel-like element 32. The operating depth of this digger element 32 and also the height of the framework and drape 28 and 30 respectively are determined by the screw threaded adjustment 34 mounted between the plates 20 and having an operating wheel 36.

This device ordinarily is drawn by a tractor and secures its driving means from this tractor. The driven connecting rod 38 is shown entering the universal gear box 40 which is equipped with a gear shifting lever 42 and from this point the drive is transmitted to the differential 43. Upon the plates 22 are mounted sprocket wheels 44 and 45 which are driven directly from the differential 43. The plates 24 support additional sprocket wheels 46 and 50—52 respectively (Figure 1). An arm 54 is welded or otherwise attached to the plate 24. This arm 54 supports a sprocket 56 which acts as a separating sprocket for a chain 58 driven by the sprocket 44. Upon the rear upper end of the framework 28 is mounted a sprocket 60 which the chain 58 drives. This sprocket 60 is keyed to a shaft 62 which in turn drives sprockets mounted within the housing 28 around which the drape 30 is rotated.

Upon the outer face of the upright 26 is mounted a further rotatable sprocket 64 which is also driven by the chain 58. Keyed to the same shaft as the sprocket 64 is another smaller sprocket 66 which drives the chain 68 which in turn drives the sprocket 70 rotatably mounted upon the fertilizer dispensing container 72 by the shaft 74. The under side of the fertilizer dispensing container 72 is equipped with holes through which the fertilizer drops. In order that these holes will not become clogged up an agitator or some other similar device is mounted therein and rotated by the shaft 74. The agitation of the fertilizer insures a constant dispensing of the same down through the holes in the bottom of the container from where it drops to an inclined plate 76 and from there it slides down to the bottom of the freshly excavated tulip bed.

The sprocket 52 drives the chain 78 which operates the sprocket 80 keyed to the shaft 82 which operates a differential 84. Keyed to the opposite end of the shaft 82 is a gear 85 which drives the gear 86 (Figure 2). The gear 86 is permitted to revolve about the gear 85 upon the raising or lowering of a bedder plate 87. These gears 85 and 86 are maintained in a constant meshed relationship by the tie rod 89. Positioned behind the gear 86 is a sprocket (not shown) which drives a chain connected to and operating the rotor tiller 88. A bracket 90 separates the rotor tiller 88 from the sprocket driven by the gear 86 and maintains a constant distance between these two elements upon the raising or lowering of this bedder plate 87 by means of a winch 91. The end of this winch has a ratchet 92 integrally attached thereto. The winch and ratchet 91 and 92 are rotated by the crank 93. A pawl 94 coacts with the ratchet to prevent unwinding of the winch. A cable 95 is securely fastened to the bedder plate 87 and another cable 96 runs over a pulley 97 and fastens to another portion of the bedder plate. These two cables are fastened to the winch 91 and upon the turning of the crank 93 the bedder plate is raised or lowered as desired. A rotating marking apparatus 98 is drawn by the device and after the tulip bed is ready for planting this causes evenly spaced transverse rows to be indicated or marked off in the surface of the newly excavated ground. When the tulip bedder is drawn by a tractor or some other means across a field in which tulips are to be planted, the digger or scooping element 32 adjustably positioned at some predetermined level scoops up the dirt down to that particular level and the forward motion of the entire tulip bedder passes the dirt loosened by the scoop 32 up on the conveyor or drape 30 which is composed of a series of flat strips 31. This revolving drape 30—31 transports the dirt to its upper end and from there drops it onto a transverse conveyor or drape 99 which is operated by chains and sprockets driven from the differential 84. This transverse drape projects out beyond one side of the machine to a point where it is just above a previously excavated tulip bed. The dirt falls into and fills this bed after tulip bulbs have been placed therein, thereby covering the same. The width of the bed makes it necessary to supply some spreading means for this dirt and this is accomplished by a fan-shaped group of rods or the like 15. The dirt falls from the drape 99 onto the group of rods 15 which are located over the center of the adjacent bed. Any large lumps of dirt which are not too hard are broken up or crumbled at this point and only a fine dirt falls directly onto the tulip bulbs, the larger lumps being shifted to the sides of the bed or acting as top filler for the bed. The weight of the free ends of the rods causes a raking, dragging and spreading effect on the newly filled tulip bed. As the device proceeds along the trough and bed, wings or attachments 17 from the bedder plate 87 placed at a small distance above the base of the bed, tend to evenly distribute any dirt that has fallen in from the sides or other places evenly over the entire base of the bed. This operation maintains a layer of loose dirt in the base of the bed. The main bedder plates 87 are in actuality, side shaping plates and insure approximately strong vertical sides for the bed or trough which then have less tendency to cave in. In this connection, there is illustrated in Figure 8 a modified form of the invention whereby straight sided trenches can be more readily cut. In this figure, the scoop or scraper 28—32 is equipped at its forward portion and on each side thereof with cutter disks 102 which can be conveniently driven by suitable connections with some other driving means such as the sprockets 44 (Figure 2). These cutting disks penetrate the earth more readily and enable the scoop to more readily carry away dirt which has been preliminarily cut and loosened by the revolving disks. At the same time, a straight sided furrow results.

As best shown in Figure 2, a projection 103 can also be fitted into each of the elements 32 of the scoop or framework 28, these also acting to preliminarily cut and loosen the earth and to also help control the depth at which the scoop or framework is operating. After these operations have been performed, fertilizer is dropped in the bed as previously described from the hopper 72 down the plate 76 which is preferably corrugated. Immediately following this, the rotor tiller churns the fertilizer with the layer of dirt in the base of the bed and causes a better growth of tulips because of this actual mixture of fertilizer with the surrounding dirt. The tulip bed row is then complete except for the marking or indenture of transverse rows which are used as guides for the planters of the tulip bulbs. The marking device 98 is simply dragged along after the tulip bedder and marks the bed with its several slat or armlike transverse extremities 101 as it turns. The diameter of this marking device can be increased or decreased as desired. If decreased, the rows are closer together and if the diameter of the marker is increased, the rows will thus be farther apart.

As best shown in Figures 5 and 6, the rotor tiller is built on a hollow shaft 19 which is rotatably mounted over a stationary shaft 21 with bearings 23 as shown in Figure 7. The stationary shaft 21 is mounted between the two bedder plates 87 and held firmly thereto. The space between the two shafts 19 and 21 is continually kept filled with grease which has a tendency to ooze out through the end bearings shown in Figure 7 and thus prevents the dirt through which it is revolving from entering into this hollow portion between the two shafts. Tooth attaching elements 29 are welded or otherwise fastened around the hollow shaft 19 at regularly spaced intervals. Spring teeth 25 are removably fastened by bolts or the like 31 to the tooth attaching elements 29. Each tooth has at least one coil spring 27 in its make-up which is placed between the end of the tooth 25 and the tooth attaching element. The advisability of resilient teeth is occasioned by the possibility that rocks or other solid foreign substances may be in the dirt through which the rotor tiller is running and would tend to break the teeth when they came in contact if there were no allowance for yielding back spring on the teeth. Further means are provided which allow for the stopping of the apparatus when striking rocks or other impediments. This comprises a slip clutch 29', as best shown in Fig. 1, to further insure against teeth breakage on the rotor tiller. This is a regular friction slip clutch and when undue strain is placed on the driving means, it automatically allows for a slipping action and reduces the drive on the rotor tiller considerably. This action in combination with the forward motion of the entire device allows the teeth to pass over any rock whereupon the slip clutch drops back into its regular position and the drive to the rotor tiller is resumed as usual.

Figure 6 shows a side elevation of the driving means for the differential 84. The drape framework 28 is shown pivoted on the upright 26 at 33. A dirt guard 35 is placed above the gears 85—86 to prevent dirt from falling from the upper end of the drape into these gears and thus clogging the same.

The main drape 30a can be made with angle irons instead of the plain flat strips as best shown in Figure 7, at 77. The chains of the drape 30a have protecting shields 100 which prevent dirt from hindering their operation.

It will be seen that this machine is capable of preparing a bed for the ready planting of tulip bulbs. At the present time, tulip bulbs are planted in single rows having width for the reception of one line of bulbs. A machine digging and preparing this row must necessarily have wheels or other supports on either side which, therefore, require some shoulders of definite width between these single rows. It has been found that the device of this invention because of no caving-in, as with furrows, requires shoulders of less width between the rows or beds and yet the beds described by applicant are wide enough for the reception of from eight to thirty rows of bulbs. When the raising of bulbs is done as a business, the full utilization of a field completely set aside for such bulbs is very important. Tulips planted by the usual method in this country would be in double rows; i. e., thirty-six centers, and would have only one-third or one-fourth as many bulbs per acre as when planted by the use of this device. Therefore, the use of this machine will reduce waste or unused portions of the field to a minimum. It is estimated that by the use of this device, it is possible to obtain a growth of four or five times the number of tulips ever before possible in a field of the same size. Obviously, other bulbous plants may be planted by the use of this invention.

Another use for the machine of this invention is its employment in sterilizing soils by the use of chloropicrin or analogous chemicals. Ordinarily, this sterilization is accomplished by injecting gas or liquid into the soil at intervals which is both expensive and not particularly efficient in that an even distribution is hardly possible.

The bedding apparatus of this invention may be employed wherein a tank of sterilizing fluid is mounted on the machine with means adapted to sprinkle the fluid onto the bottom of the excavated bed directly ahead of the rotor tiller. This is approximately the same operation as described in connection with the distribution of fertilizer from the container 72. Then, instead of carrying the earth to one side of the machine, it can be delivered into the same bed directly behind the rotor tiller. The gas from the liquid tends to move upwardly through the loose recently deposited soil, and, therefore, give more even distribution, and better penetration is obviously accomplished.

I am aware that many changes may be made and numerous details of construction varied throughout a wide range without departing from the principles of this invention, and, I, therefore, do not propose limiting the patent granted hereon otherwise than as necessitated by the prior art.

I claim as my invention:

1. A bulb bedder comprising a frame work, wheeled supports for the frame work, excavating means at the forward end of the frame work, a conveyor for carrying excavated dirt upwardly and rearwardly of the machine, further conveyor means for delivering the excavated dirt to one side of the machine, and means for defining the sides of the excavated trough.

2. A bulb bedder comprising a frame work, wheeled supports for the frame work, excavating means at the forward end of the frame work, a conveyor for carrying excavated dirt upwardly and rearwardly of the machine, further conveyor means for delivering the excavated dirt to one side of the machine, and means for defining the sides of the excavated trough, and smoothing the bottom of said trough.

3. A bulb bedder comprising a frame work, wheeled supports for the frame work, excavating means at the forward end of the frame work, a conveyor for carrying excavated dirt upwardly and rearwardly of the machine, further conveyor means for delivering the excavated dirt to one side of the machine, and means for defining the sides of the excavated trough, and smoothing the bottom of said trough, while at the same time, evenly distributing loose earth over the bottom of the trough.

4. A bulb bedder comprising a frame work, wheeled supports for the frame work, excavating means at the forward end of the frame work for forming a trough, a conveyor for carrying excavated dirt upwardly and rearwardly of the machine, further conveyor means for delivering the excavated dirt to one side of the machine, and means for mixing fertilizer with the earth in the trough bottom.

5. A bulb bedder comprising a frame work, wheeled supports for the frame work, excavating means at the forward end of the frame work for forming a trough, a conveyor for carrying excavated dirt upwardly and rearwardly of the machine, further conveyor means for delivering the excavated dirt to one side of the machine, means for mixing fertilizer with the earth in the trough bottom, and marking means for automatically indicating the lines in which bulbs are to be planted in the bottom of the excavated trough.

6. A bulb bedder comprising a frame work, wheeled supports for the frame work, digging and excavating means at the forward end of the frame work for forming a trough, a conveyor for carrying excavated dirt upwardly and rearwardly of the machine, further conveyor means for delivering the excavated dirt to one side of the machine, means for mixing fertilizer with the earth in the trough bottom, marking means for automatically indicating the lines in which bulbs are to be planted in the bottom of the excavated trough, together with means for adjusting the effective height of the digging means.

7. A bulb bedder comprising a frame work, wheeled supports for the frame work, digging and excavating means at the forward end of the frame work for forming a trough, a conveyor for carrying excavated dirt upwardly and rearwardly of the machine, further conveyor means for delivering the excavated dirt to one side of the machine, means for mixing fertilizer with the earth in the trough bottom, and marking means for automatically indicating the lines in which bulbs are to be planted in the bottom of the excavated trough, means for adjusting the effective height of the digging means, and means for adjusting the effective depth of the trough, defining sides and bottom.

8. A bulb bedder comprising a frame work, wheeled supports for the frame work, digging and excavating means at the forward end of the frame work for forming a trough, a conveyor for carrying excavated dirt upwardly and rearwardly of the machine, further conveyor means for delivering the excavated dirt to one side of the machine, means for mixing fertilizer with the earth in the trough bottom, marking means for automatically indicating the lines in which bulbs are to be planted in the bottom of the excavated trough, means for adjusting the effective height of the digging means, and means for adjusting the effective depth of the trough, defining sides and bottom, said last named means comprising a winch, cable and a pawl and ratchet arrangement.

9. A bulb bedder comprising a frame work, wheeled supports for the frame work, digging and excavating means at the forward end of the frame work for forming a trough, a conveyor for carrying excavated dirt upwardly and rearwardly of the machine, further conveyor means for delivering the excavated dirt to one side of the machine, means for mixing fertilizer with the earth in the trough bottom, marking means for automatically indicating the lines in which bulbs are to be planted in the bottom of the excavated trough, means for adjusting the effective height of the digging means, and means for adjusting the effective depth of the trough, defining sides and bottom, said last named means comprising a winch, cable and a pawl and ratchet arrangement, a rotary tilling element adapted to operate on the excavated trough bottom, and driving means for the same.

10. A bulb bedder comprising a frame work, wheeled supports for the frame work, digging and excavating means at the forward end of the frame work for forming a trough, a conveyor for carrying excavated dirt upwardly and rearwardly of the machine, further conveyor means for delivering the excavated dirt to one side of the machine, means for mixing fertilizer with the earth in the trough bottom, marking means for automatically indicating the lines in which bulbs are to be planted in the bottom of the excavated trough, means for adjusting the effective height of the digging means, and means for adjusting the effective depth of the trough, defining sides and bottom, said last named means comprising a winch, cable and a pawl and ratchet arrangement, a rotary tilling element adapted to operate on the excavated trough bottom, and driving means for the same, said driving means including gears in constant meshed relationship.

11. A bulb bedder comprising a frame work, wheeled supports for the frame work, digging and excavating means at the forward end of the frame work for forming a trough, a conveyor for carrying excavated dirt upwardly and rearwardly of the machine, further conveyor means for delivering the excavated dirt to one side of the machine, means for mixing fertilizer with the earth in the trough bottom, marking means for automatically indicating the lines in which bulbs are to be planted in the bottom of the excavated trough, means for adjusting the effective height of the digging means, and means for adjusting the effective depth of the trough, defining sides and bottom, said last named means comprising a winch, cable and a pawl and ratchet arrangement, a rotary tilling element adapted to operate on the excavated trough bottom, and driving means for the same, said driving means including gears in constant meshed relationship, regardless of adjusted height.

12. In a bulb bedder, means for excavating a trough of predetermined width, means for shifting excavated earth to one side of the trough, means for defining the sides of said trough, and a rotary tiller for further digging action on the trough bottom.

13. In a bulb bedder, means for excavating a trough of predetermined width, means for shifting excavated earth to one side of the trough, means for defining the sides of said trough, a rotary tiller for further digging action on the trough bottom, and spring teeth on the tiller.

14. In a bulb bedder, means for excavating a trough of predetermined width, means for shifting excavated earth to one side of the trough, means for defining the sides of said trough, a rotary tiller for further digging action on the trough bottom, spring teeth on the tiller, said tiller including a fixed shaft, and a sleeve spaced from and rotatably positioned on the shaft, the space between the sleeve and shaft being packed with grease.

CLYDE HOMAN.